Figure 1:
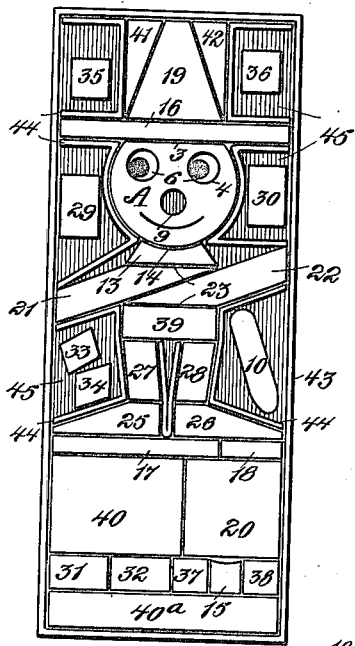
Figure 16:
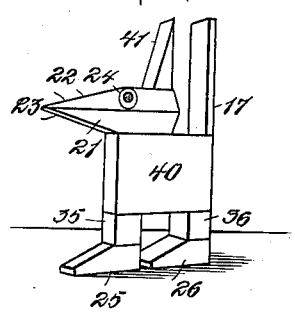

R. E. HUMBERT.
TOY BLOCK.
APPLICATION FILED AUG. 24, 1916.

1,209,440.

Patented Dec. 19, 1916.
2 SHEETS—SHEET 1.

WITNESSES

INVENTOR
R. E. Humbert
BY
ATTORNEYS

R. E. HUMBERT.
TOY BLOCK.
APPLICATION FILED AUG. 24, 1916.
1,209,440.
Patented Dec. 19, 1916.
2 SHEETS—SHEET 2.
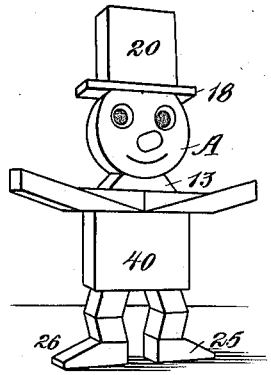
Fig.7.
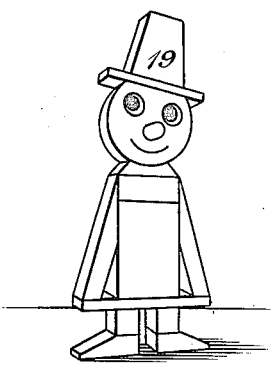
Fig.8.
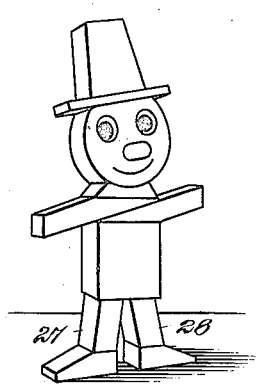
Fig.9.
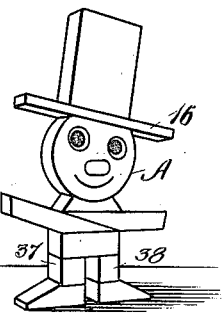
Fig.10.
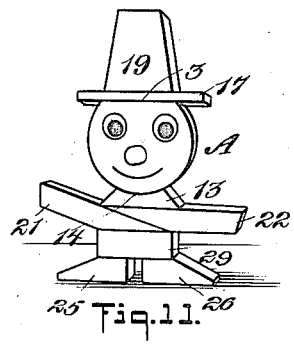
Fig.11.
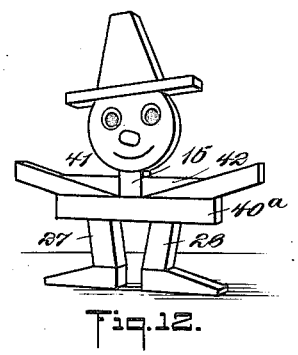
Fig.12.
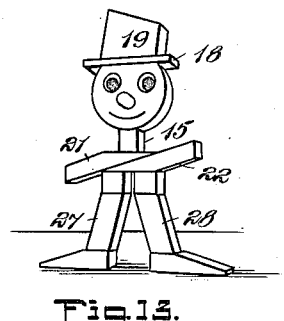
Fig.13.
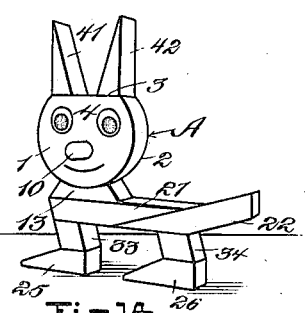
Fig.14.
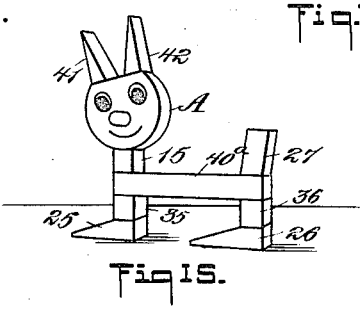
Fig.15.
WITNESSES
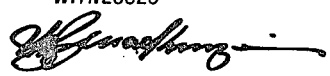
INVENTOR
R. E. Humbert
BY 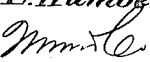
ATTORNEYS

UNITED STATES PATENT OFFICE.

RICHARD EDWARD HUMBERT, OF MONTCLAIR, NEW JERSEY.

TOY BLOCKS.

1,209,440.  Specification of Letters Patent.  Patented Dec. 19, 1916.

Application filed August 24, 1916. Serial No. 116,595.

*To all whom it may concern:*

Be it known that I, RICHARD E. HUMBERT, a citizen of the United States, and a resident of Montclair, in the county of Essex and State of New Jersey, have invented new and Improved Toy Blocks, of which the following is a full, clear, and exact description.

This invention relates to the class of toys, and particularly to toy blocks of that type from which various figures can be assembled.

The invention has for its general objects to provide a novel set of blocks the various parts of which can be put together in different combinations to represent in odd or grotesque shapes human or other animal forms and birds.

A more specific object of the invention is the provision of a head block having a novel arrangement of eyes, whereby various expressions can be obtained, and a special form of nose which can be adjusted to different positions also for varying the expression or appearance.

A further object of the invention is the provision of a head block having a front face to both of which the nose and eye pieces are common, whereby the expression at the front may be different from that at the rear.

Another object of the invention is to provide other blocks which are adapted to coöperate with the head block to form a variety of figures, the blocks being simply placed one on top of another in certain interlocking relation, so that the figures can be easily and quickly set up or taken down without the necessity of fastening devices.

Another object is to provide a pair of coacting faces which have beveled ends which can be overlapped or interposed between other blocks to form arms or other members, one of such blocks having an eye set therein so that the beveled blocks can be used for representing part of the head of a bird.

Still another object is to improve the system of packing the blocks in a case or box, whereby certain of the blocks will represent a figure which is held in place by the use of partitions that in turn provide compartments in which certain of the other blocks of the set can be placed, this arrangement being advantageous, in that it forms an effective display of the set of blocks.

With such objects in view, and others which will appear as the description proceeds, the invention comprises various novel features of construction and arrangement of parts which will be set forth with particularity in the following description and claims appended hereto.

Figure 19:
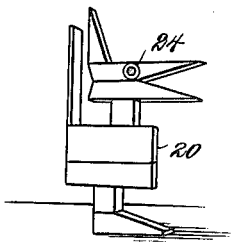
Figure 17:
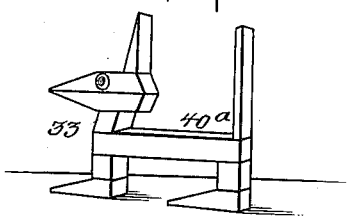
Figure 4:
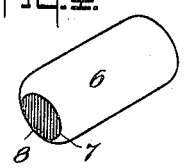
Figure 2:
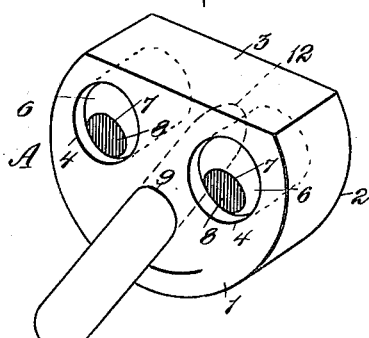
Figure 5:
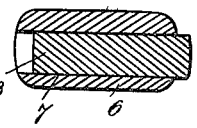
Figures 3, 6:
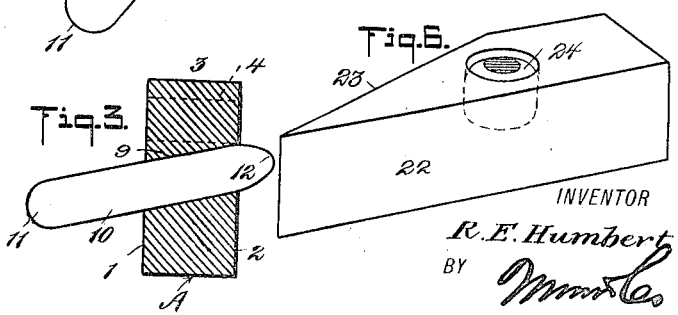

In the accompanying drawings which illustrate one embodiment of the invention and wherein similar characters of reference indicate corresponding parts in all the views, Figure 1 is a plan view of a box with a set of blocks packed therein; Fig. 2 is a perspective view of the head block with the nose and eye pieces therein; Fig. 3 is a central vertical section of the head piece; Fig. 4 is a perspective view of one of the eye pieces; Fig. 5 is a longitudinal section of one of the eye pieces; Fig. 6 is a perspective view of one of the arm pieces with an eye set therein; Figs. 7 to 13 inclusive are perspective views showing men in various attitudes; Figs. 14 to 18 inclusive are perspective views showing various forms of animals made with the blocks; and Fig. 19 is a perspective view showing a bird made with the blocks.

Referring to the drawings, A designates the head block which has flat front and rear faces 1 and 2 and is approximately circular in contour, except at the top where a flat horizontal surface 3 is provided for supporting a hat. Extending from the front to the rear surface are parallel openings 4 for receiving eye pieces 6. Each eye piece is a cylindrical block having a passage or opening 7 extending longitudinally therethrough but in eccentric relation to the axis of the block. In this passage 7 is a pupil-forming member 8, the ends of which are colored differently from the ends of the body of the eye-piece. The eye pieces are longitudinally and rotatably adjustable frictionally held in the openings 4, so that the eye pieces can be set to produce various effects, as, for instance, both eyes can look to the right and left or up and down, or one eye can be looking to the right and the other to the left, or other directions. Furthermore, the eyes can have a sunken or popping appearance. Also in the head block is a passage 9 extending from the front to the rear, but at a slight angle of inclination to the faces 1 and 2, and in this opening 9 is insertible a nose piece 10 having one end 11 blunt and the other end 12 pointed, this nose piece being of such length that both ends can extend from opposite faces of the head block, whereby the head block is made with two faces, the nose pointing down at one side and pointing up at the opposite side.

Coöperating with the head block is a neck block 13 which is very wide compared with its height, and has an arcuate upper surface 14 so as to form a seat for receiving the head piece, and the bottom surface of the block 13 is flat, so as to rest upon other blocks which may be used to produce a figure. A narrower neck block 15 may be substituted for the neck block 13, as in Figs. 12 and 13. On the flat top surface 3 of the head block any of the strip-like blocks 16, 17, 18 may be placed to represent the brim of a hat, while either of the blocks 19 or 20 may be used to form the crown or body of the hat, as shown in Figs. 1 and 7 to 13 inclusive.

Two blocks which form important pieces of the set are the blocks 21 and 22, which are provided with beveled surfaces 23 which enable these blocks to be overlapped at their beveled ends in various positions shown in several of the figures, whereby they form arms or other members when arranged in overlapping relation. Horizontal and parallel surfaces are provided by the upper and lower sides of these overlapping blocks so that they can rest on other blocks and other blocks can rest stably on them. These members need not be overlapped one with respect to the other, but can be interposed between other blocks or placed against other blocks, as shown in Figs. 7, 8 and 12, to represent arms in various positions. In Fig. 14 one member is shown as constituting a portion of the body of an animal and the other member the remaining portion and the tail of the animal. These two members 21 and 22 can be also used in conjunction to constitute the head of an animal or bird, as shown in Figs. 16 to 19 inclusive, one of the members having set in one side face an eye 24, as shown in Figs. 6 and 16 to 19 inclusive. When the member 22 is not used as part of the head but as forming an arm or other member of the figure, the side of the block 22 which has the eye is turned to the rear so as not to be seen.

Two other blocks which are generally used in the various figures are the blocks 25 and 26, which constitute the feet of the figures, and the legs can be made up of any of the pairs of blocks 27, 28 or 29, 30, or 31, 32 or 33, 34 or 35, 36 or 37, 38. These various pairs of blocks may be used in combination or singly.

Figure 18:
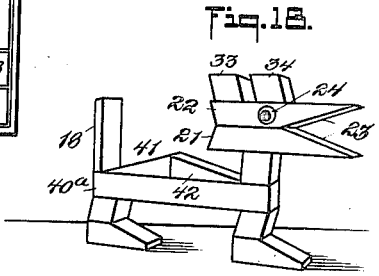

To produce the body of a figure any of the blocks 39, 40 or 40ª may be employed singly or combined with any of the other blocks. The set of blocks may also include the triangular blocks 41 and 42, one use of which is shown in Fig. 18. Obviously blocks of other shapes may be employed to enlarge the variety of combinations in figure making. The blocks are put up in sets in a suitable container or box 43, and for presenting an attractive display and to illustrate the use of the set, certain of the blocks are put together to represent a figure, as shown in Fig. 1, and the blocks of the figure are maintained in proper relation by strips of cardboard or other material 44, shaped to form partitions following the contour of the figure, and also to form compartments 45 into which other blocks which do not enter into the make-up of the figure can be placed. The additional blocks of the set can be packed in one end of the box, as shown at the bottom, Fig. 1.

From the foregoing description, taken in connection with the accompanying drawings, the advantages of the construction and method of operation will be readily understood by those skilled in the art to which the invention appertains, and while I have described the principle of operation, together with the set which I now consider to be the best embodiment thereof, I desire to have it understood that the set shown is merely illustrative and that such changes may be made when desired as fall within the scope of the appended claims.

Having thus described my invention, I claim as new and desire to secure by Letters Patent:

1. In a set of blocks, a head block having an eye opening extending entirely through the same and of uniform diameter throughout its length and an eye-piece set therein and frictionally held in the opening in any position of adjustment.

2. In a set of blocks, a head block having an eye opening and an eye-piece set therein said eye-piece being formed of a body portion representing the ball of an eye and an inserted pupil portion.

3. In a set of blocks, a block having an eye opening and an eye-piece set therein, said eye-piece being formed of a body section provided with an eccentric opening, and a pupil-forming section disposed in the opening.

4. In a set of blocks, a head block having an opening extending therethrough, and an eye-piece longitudinally and rotatably adjustable in the opening.

5. A head block having apertures extending therethrough, and independently adjustable cylindrical eye-pieces in the apertures and frictionally held therein.

6. A head block having apertures extending therethrough and independently adjustable eye-pieces in the apertures, each eye-piece being formed of a body section having a passage therethrough and a pupil-forming section inserted in the said passage.

7. A head block having eye openings extending therethrough, eye-pieces adjustably mounted in the eye openings, and a nose-piece adjustably mounted in the nose opening, whereby the block will have two faces.

8. A head block having eyes and also an opening of round cross-section, and a nose-piece of the same diameter throughout its length and removably inserted in the opening.

9. A head block having a flat front face provided with an opening disposed at an angle to the said face, eyes on the said face, and a nose-piece having differently shaped ends and either end being removably insertible in the nose opening.

10. In a set of blocks, a head block having a circular contour, and a neck-piece having an arcuate upper surface to form a seat for the head block to rest thereon.

11. In a set of blocks, a head block having a circular contour, and a neck-piece having an arcuate upper surface to form a seat for the head block to rest thereon, the top of the head block being flat, and blocks resting on the flat top of the head piece to represent a hat.

12. In a set of blocks, a pair of blocks having parallel sides and each beveled at one end, one of the blocks having an opening and a cylindrical eye set within and frictionally held in the opening.

RICHARD EDWARD HUMBERT.

Witnesses:
WILLIAM H. SENIOR,
SAMUEL H. WENCK.